US012661923B2

United States Patent
(12) United States Patent
Calmet et al.

(10) Patent No.: US 12,661,923 B2
(45) Date of Patent: Jun. 23, 2026

(54) PERSONALIZABLE SECURITY DOCUMENT AND METHOD OF PERSONALIZING THE SAME

(71) Applicant: Toppan Security SAS, Paris (FR)

(72) Inventors: Arnaud Calmet, Fanjeaux (FR); Mathieu Loncle, Bordeaux (FR); Nipun Sharma, Suresnes (FR)

(73) Assignee: Toppan Security SAS, Paris (FR)

(*) Notice: Subject to any disclaimer, the term of this patent is extended or adjusted under 35 U.S.C. 154(b) by 0 days.

(21) Appl. No.: 18/983,716

(22) Filed: Dec. 17, 2024

(65) Prior Publication Data

US 2025/0229566 A1 Jul. 17, 2025

(30) Foreign Application Priority Data

Jan. 12, 2024 (EP) .................................... 24315011

(51) Int. Cl.

| | |
|---|---|
| ***B42D 25/435*** | (2014.01) |
| ***B42D 25/328*** | (2014.01) |
| ***B42D 25/333*** | (2014.01) |
| ***B42D 25/373*** | (2014.01) |

(52) U.S. Cl.

CPC ......... *B42D 25/435* (2014.10); *B42D 25/328* (2014.10); *B42D 25/333* (2014.10); *B42D 25/373* (2014.10)

(58) Field of Classification Search

CPC .. B42D 25/435; B42D 25/328; B42D 25/333; B42D 25/373

USPC ....... 283/67, 70, 72, 74, 77, 86, 94, 98, 113, 283/901

See application file for complete search history.

(56) References Cited

U.S. PATENT DOCUMENTS

2004/0232691 A1* 11/2004 Lazzerini ................. B41M 3/14 283/67
2007/0087173 A1 4/2007 Endres et al.
2009/0315316 A1* 12/2009 Staub ..................... B42D 25/00 347/225

(Continued)

FOREIGN PATENT DOCUMENTS

EP 4303028 1/2024
GB 2566706 3/2019

(Continued)

OTHER PUBLICATIONS

"European Application Serial No. 24315011.7, Extended European Search Report mailed Jun. 19, 2024", 7 pgs.

(Continued)

*Primary Examiner* — Justin V Lewis

(74) *Attorney, Agent, or Firm* — Schwegman Lundberg & Woessner, P.A.

(57) ABSTRACT

A personalizable security document includes a combination of two secure features, namely, a laser-engravable material, and a hologram overlapping the laser-engravable material. The metallic properties of the laser-engravable material result in an enhancement of the holographic effect obtained from the hologram. Additionally, the hologram may extend to other portions of the security document in a continuous manner, for example, as a full-page hologram. This may connect the secondary image formed in the laser-engravable material with other features provided in different portions of the security document to further increase the security.

19 Claims, 3 Drawing Sheets

(56) References Cited

U.S. PATENT DOCUMENTS

| | | | | |
|---|---|---|---|---|
| 2011/0007374 | A1* | 1/2011 | Heim | B42D 25/425<br>359/884 |
| 2020/0086675 | A1* | 3/2020 | Ide | B42D 25/46 |
| 2023/0226839 | A1* | 7/2023 | Cape | B42D 25/328<br>283/72 |

FOREIGN PATENT DOCUMENTS

| | | | |
|---|---|---|---|
| WO | 03039888 | | 5/2003 |
| WO | WO-2022248309 | A1 | 12/2022 |
| WO | 2023170146 | | 9/2023 |

OTHER PUBLICATIONS

"European Application Serial No. 24315042.2, Extended European Search Report mailed Jul. 10, 2024", 7 pgs.

* cited by examiner

PERSONALIZABLE SECURITY DOCUMENT AND METHOD OF PERSONALIZING THE SAME

CROSS-REFERENCE TO RELATED APPLICATION(S)

This application claims priority to European Patent Appl. No. 24315011.7, filed Jan. 12, 2024, which is incorporated herein by reference in its entirety.

TECHNICAL FIELD

The present disclosure generally relates to security features for security documents, in particular, personalizable security documents such as identification documents, driver's licenses and the like.

BACKGROUND

Generally, in the market of physical identification documents, a variety of different security features are used to ensure the document's security and integrity. In some applications, a laser-engraved image is considered vital, as the image features are generated inside a polycarbonate substrate rather than on the surface of the substrate making it more difficult to tamper with the document. A laser-engraved feature in a polycarbonate substrate may include a black and white (in particular, grayscale) image, a color image, or special features like the Mirage security feature of HID.

WO 2022/248309 A1 discloses a personalizable security document including a combination of a plurality of different features. In particular, a laser-engraved image is provided in a first layer of the security document, and one or more fluorescent inks are provided in further layers of the same. A laser-engraving of the image is performed from a first side of the substrate, such that patterns formed by the fluorescent inks are not affected. Under white light, the laser-engraved image can be viewed from the first side, whereas a multi-color fluorescence of the patterns can be observed from a second side under UV light.

The present disclosure is directed, at least in part, to improving or overcoming one or more aspects of prior systems, without being limited to a particular type of security document.

SUMMARY OF THE DISCLOSURE

According to one aspect of the present disclosure, a personalizable security document has a substrate having a first side and a second side opposite to the first side in a thickness direction of the substrate, and a security feature formed in the substrate and extending through at least part of the substrate along the thickness direction. The security feature includes a laser-engravable material configured to have a personalized image laser-engraved in the same. The laser-engravable material includes at least one type of pigments exhibiting a color-change effect upon irradiation with laser light. The laser-engravable material is embedded in the substrate and is visible when the substrate is viewed from the first side under white light. The security feature further includes a hologram provided towards the first side from the laser-engravable material. The hologram overlaps the laser-engravable material at least in part and is visible when the substrate is viewed from the first side under white light.

In another aspect of the present disclosure, a method of personalizing a security document includes providing a personalizable security document in accordance with the above aspect, and laser engraving a personalized image in the laser-engravable material by varying one or more laser parameters. The personalized image is laser-engraved through the hologram from the first side.

Other features and aspects of the present disclosure will be apparent from the following description and the accompanying drawings.

DETAILED DESCRIPTION

Figure 1:
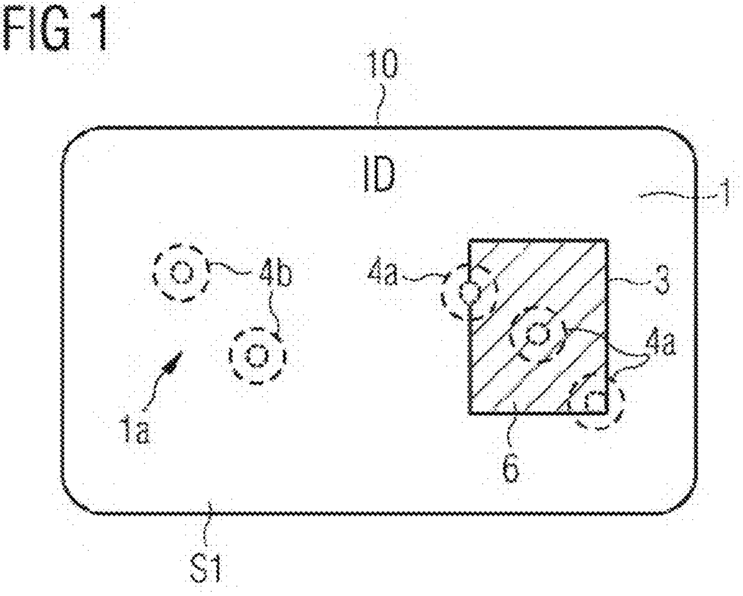
FIG. 1 shows a plan view of an exemplary personalizable security document in accordance with the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that the security of a secondary portrait formed in a window of a security document can be increased by combining two different security features, namely, a laser-engraved personalized image formed inside a substrate of the security document, and a hologram formed on top of the laser-engraved personalized image, at a position that corresponds to the personalized laser-engraved image or extending over the whole document.

As used herein, the term "hologram" covers any known type of hologram that is commonly used in security features, such as, for example, holographic switches, Fresnel type or other diffractive lenses, 3D stereograms, 2D/3D holograms including a static background, dimensional holograms (1D, 2D, 2D/3D), reflection holograms, transmission holograms, Denisyuk holograms, white light transmission holograms, pulse laser holograms, multi-channel holograms, hologram stereograms, 360° holograms, or any combination of the same, with different types of metallization for the holograms, such as transparent holograms, metal aluminum holograms, copper holograms or any other kind of colored metal holograms.

It has been realized that, especially when the material that forms the laser-engravable layer includes metallic particles such as Al and Ag particles, as in the Mirage security feature of HID, this can be combined with the hologram in an advantageous manner. In particular, the optical properties of the metallic particles in the laser-engravable material enhance at least some of the optical effects that are achieved by the hologram. As the two different features are linked to each other, it becomes more difficult to forge the security document, because the combined effect of the two features has to be replicated.

It has also been realized that it may be advantageous when the hologram that covers the laser-engravable material extends to other parts of the security document, for example, in a continuous manner. Such a hologram can cover a large part, or even the entire surface of the security document. This creates a strong link between the holographic security feature of the document and the personalized laser-engraved image. In particular, the corresponding features, i.e. the personalized image and the hologram, can be provided in different planes, for example, different layers of the security document. If one of the layers is altered, the final effect of the combined feature may vanish, and it is therefore very difficult to forge this combined feature.

In addition to the above-described effect of the metallic particles, which may enhance the light diffraction in the portion of the hologram provided over the secondary portrait, it has also been realized that, in particular when the hologram is a Fresnel type or other diffractive lens, the hologram may act as an enhancer for the visual appearance of the personalized image. This is because the light will be diffracted by the holographic lens prior to the interaction with the personalized image, resulting in an optical 3D effect in the area of the personalized image.

Moreover, a precise registration between the holographic features and the personalized image can result in an additional advantage. If, for example, the personalized image is only provided in a specific area of the laser-engravable material, an unmodified part of the laser-engravable material may create a different effect on the portion of the hologram overlapping the same. Accordingly, different holographic features can have different properties, depending on their position over the laser-engravable material. This allows changing the appearance of specific holographic features when the hologram is viewed together with the underlying personalized image. In particular, a metallic effect in the personalized portion of the material can enhance the holographic effect compared to the unprocessed portion of the material, due to reflection by the personalized portion.

The present disclosure is also based at least in part on the realization that a watermark can be used in combination with the above-mentioned two security features to further increase the security. Such a watermark can be provided underneath the laser-engravable material, and can be observed when the security document is viewed in transmission, while the laser-engraved image and the hologram cannot be seen. This creates a further link between the secure features, namely, the watermark, the laser engraved image, and the embossed pattern.

FIG. 1 shows a plan view of an exemplary personalizable security document 10 in accordance with the present disclosure. As shown in FIG. 1, security document 10 includes a substrate 1, for example, having a substantially rectangular shape. In particular, as shown in FIG. 1, security document 10 is a personalizable security document, i.e., does not yet include an image, for example, a photograph or the like, of a person to which the document belongs. Such an image can be formed later, for example, in an image region 1*a* provided on a first side S1 of substrate 1 in a known manner.

In addition, as shown in FIG. 1, document 10 includes a security feature 3 formed in substrate 1, which may be a window having, for example, a rectangular shape and in which one or more secure features are provided. For example, as shown in FIG. 1, security feature 3 may include a laser-engravable material 6, in which a personalized image (for example, an inverse or negative image) of the person to which the document belongs can be laser engraved.

Figure 3:
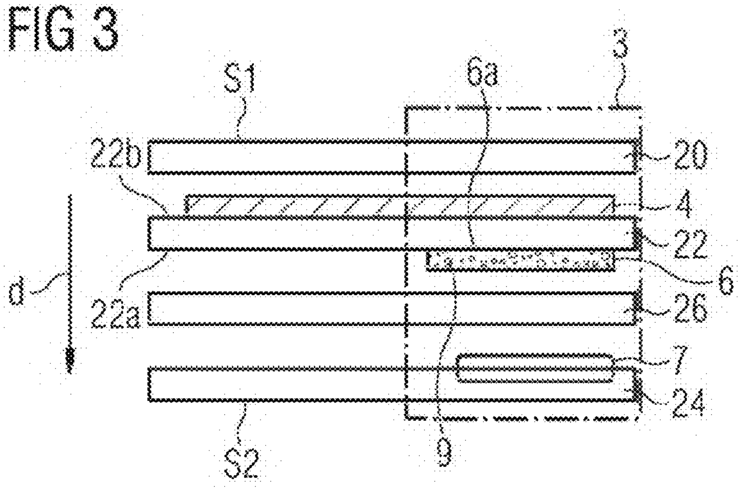
FIG. 3 shows a security feature provided in a personalizable security document in accordance with the present disclosure.

FIG. 3 shows a schematic cross-sectional view of personalizable security document 10. As shown in FIG. 3, personalizable security document 10 has substrate 1 having first side S1 and a second side S2 opposite to first side S1 in a thickness direction d of substrate 1. For example, substrate 1 may be formed by stacking a plurality of layers, for example, polycarbonate, TPU and/or PVC layers, and combining them in an appropriate manner, for example, by a lamination process or the like. This is known by the skilled person, and will therefore not be described in more detail herein.

Security feature 3 is formed in substrate 1 and extends through at least part of substrate 1 along thickness direction d. In the example shown in FIG. 3, security feature 3 extends from an uppermost layer 20 to a bottom layer 24 of substrate 1. In some embodiments, at least the portion of each layer in which security feature 3 is formed is substantially transparent or at least semi-transparent for visible light, such that laser-engravable material 6 is visible at least from first side S1 of security document 10 under white light.

As shown in FIG. 3, laser-engravable material 6 may be formed as a material layer on one of the layers forming substrate 1 of security document 10. For example, an ink may be applied onto a surface of a first layer 22 of substrate 1, for example, prior to laminating the different layers of substrate 1 to form security document 10. In other embodiments, laser-engravable material 6 may be formed in a different manner, either on a layer of substrate 1, or in a layer of the same. In any case, laser-engravable material 6 has a predetermined thickness in thickness direction d, for example, between 1 μm and 100 μm, preferably, between 10 μm and 50 μm.

The material of laser-engravable material 6 has a property such that laser-engravable material 6 exhibits a color-change effect upon irradiation with laser light. In particular, laser-engravable material 6 includes at least one type of pigments exhibiting the color-change effect upon irradiation with laser light. As used herein, the "color-change effect upon irradiation with laser light" means that laser light that is irradiated onto laser-engravable material 6 changes at least one physical property of, for example, particles or pigments included in laser-engravable material 6 in a predetermined manner, for example, depending on the intensity of the laser light, and/or other laser parameters. One particular example is the ink that is used in the Mirage security feature of HID. In this technology, each pixel in a laser-engraved personalized image 5 (see FIGS. 4 and 5) has a defined color value, depending, for example, on a digital grayscale value of a grayscale image to be engraved. For example, a color value of blue corresponds to white in the digital grayscale image to be engraved, and a color value of gold corresponds to black in the digital grayscale image to be engraved. This means that, for example, a minimum or zero laser power results in that laser-engravable material 6 remains of an initial blue color, whereas increasing laser power results in a color change from the initial blue color towards a golden color at maximum laser power. In between the minimum and the maximum laser power, a color-change can be observed from blue to gold. In this manner, for example, a grayscale portrait of a holder of security document 10, for example, a negative or positive image, can be formed in a first surface 6*a* of laser-engravable material 6.

Here, it will be appreciated that the present application is not limited to the Mirage ink described above, and can be applied to any known laser-engravable material that includes metallic or other non-metallic, organic and/or inorganic pigments, such as leuco dyes, etc., and exhibits a color-change effect when irradiated with laser light. However, it is important to note that the color-change effect as described herein is different from a change that is obtained when a physical structure of a material layer such as a PVC, PC or PET layer or the like is modified by being burnt using a laser having a certain power. It will be appreciated that in such a manner a grayscale image can be formed in a layer of substrate 1, however, such a formation of a grayscale image by burning of the material of the layer is not to be understood as exhibiting a color-change effect in accordance with the present disclosure. Accordingly, as used herein, a material that exhibits a color-change effect is to be considered a material which changes its color from a first, in particular, chromatic color (for example, blue) to a second, different color (for example, golden), and a change from, for example, colorless or white to gray or black due to burning of material with increasing laser power is not to be considered as a color-change effect.

Returning to FIG. 3, laser-engravable material 6 is formed on first layer 22 of substrate 1. For example, the above-mentioned laser-engravable ink may be formed on a bottom surface 22*a* of first layer 22, for example, by screen printing or the like. It will be appreciated, however, that in other embodiments laser-engravable material 6 may be formed on a top surface 22*b* of first layer 22, or on another layer of substrate 1. Additionally, first layer 22 is covered by one or more second layers 20, including, for example, a protective layer or the like. The stack of layers of substrate 1 is configured such that personalized image 5 can be laser-engraved in laser-engravable material 6 from first side S1 using an appropriately configured laser, as will be described in more detail below. It will be appreciated that, in particular, as first layer 22 is covered by one or more additional layers, said additional layers are transparent for the laser light, and the laser parameters are controlled such that the material of the additional layers is not visibly modified (i.e. burned) by the laser.

Figure 2:
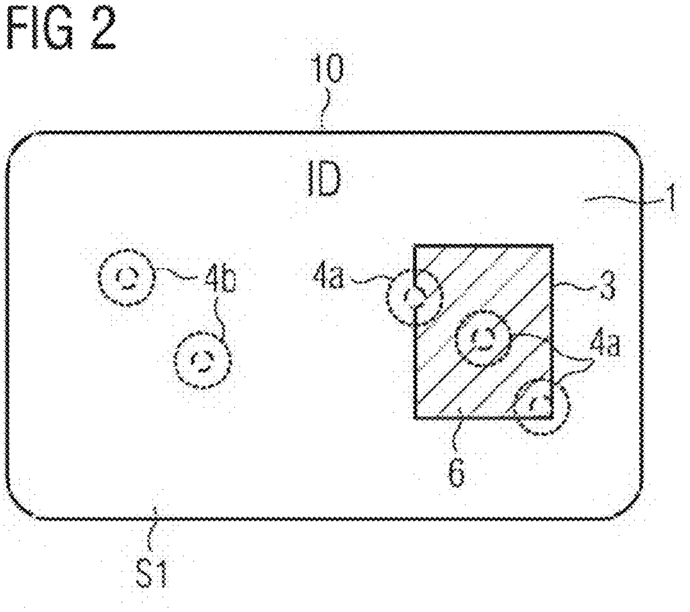
FIG. 2 shows another plan view of the personalizable security document in accordance with the present disclosure.

As shown in FIGS. 1 to 3, security feature 3 further includes a hologram 4 provided towards the first side S1 from laser-engravable material 6, i.e. on top of the same either inside substrate 1, or in or on an outer surface of substrate 1. Hologram 4 overlaps laser-engravable material 6 at least in part, and is visible when substrate 1 is viewed from first side S1 under white light. As already explained above, hologram 4 may have any appropriate configuration that results in a unique and difficult to replicate visual effect, such as a 3D effect, a holographic switch, or the like. Hologram 4 is formed in or on one of the plurality of layers of substrate 1 in a known manner, for example, by hot stamping, lamination using an adhesive, a coating process such as rotogravure or silkscreen, or other known processes.

In the example shown in FIG. 3, hologram 4 is formed on or in the same layer as laser-engravable material 6, i.e., layer 22. Here, laser-engravable material 6 is provided on a first side 22*a* of first layer 22, while hologram 4 is provided on or in a second, opposite side 22*b* of first layer 22. In other embodiments, however, laser-engravable material 6 and hologram 4 may be provided on different layers of substrate 1. For example, laser-engravable material 6 may be provided on first layer 22 of substrate 1, while hologram 4 is provided on or in a second, different layer on top of first layer 22 (not shown in FIG. 3). The layer with hologram 4 may be covered by one or more additional (protective) layers, or may be an outermost layer of substrate 1.

As also indicated in FIG. 3, in some embodiments, hologram 4 may cover an entire visible area of laser-engravable material 6 when viewed along thickness direction d. In other words, hologram 4 may completely cover laser-engravable material 6. However, it should be noted that, even when hologram 4 is described as covering an entirety of a given area, for example, of laser-engravable material 6 or substrate 1, this does not require that specific holographic features are formed at each position. It should be evident that in such a case, there may be portions of hologram 4 in which no specific holographic features are formed. However, this should still be considered as part of hologram 4. In cases where hologram 4 is formed by a foil or other material layer that is provided on one of the layers of substrate 1, this is immediately evident. However, also in cases where hologram 4 is formed in one of the layers of substrate 1, for example, by hot stamping, such a hologram should also be considered as a single (continuous) hologram when a distance between adjacent holographic features is less than, for example, 0.5 mm.

As shown in FIGS. 1 and 2, in some embodiments, hologram 4 may have a first portion 4*a* overlapping laser-engravable material 6, and a second portion 4*b* provided in a same plane as first portion 4*a* and outside security feature 3, as shown in FIG. 3. In other words, the presence of hologram 4 is not limited to the window of security feature 3, but may extend to other portions of substrate 1, for example, the region 1*a* mentioned above. This is schematically indicated in FIG. 1 and FIG. 2, where a change in the visual appearance of the portions 4*a* and 4*b* of hologram 4 when the same is viewed under different angles of observation is shown as one example for the visual effect achieved by hologram 4.

In some embodiments, first portion 4*a* and second portion 4*b* may be continuous, in the manner that has been described above. In other embodiments, however, first portion 4*a* and second portion 4*b* may also be separate portions of hologram 4. In both cases, hologram 4 may extend over at least 10%, at least 20%, at least 30%, at least 40%, at least 50%, at least 60%, at least 70%, at least 80%, at least 90%, or even 100% of an entire area of substrate 1 when viewed along thickness direction d. In other words, hologram 4 may be a so-called "full page hologram" that covers an entire surface of substrate 1 of security document 10. However, as explained above, hologram 4 may also only cover an extensive part of the entire area of substrate 1, or may be limited to the region corresponding to security feature 3.

Figure 6:
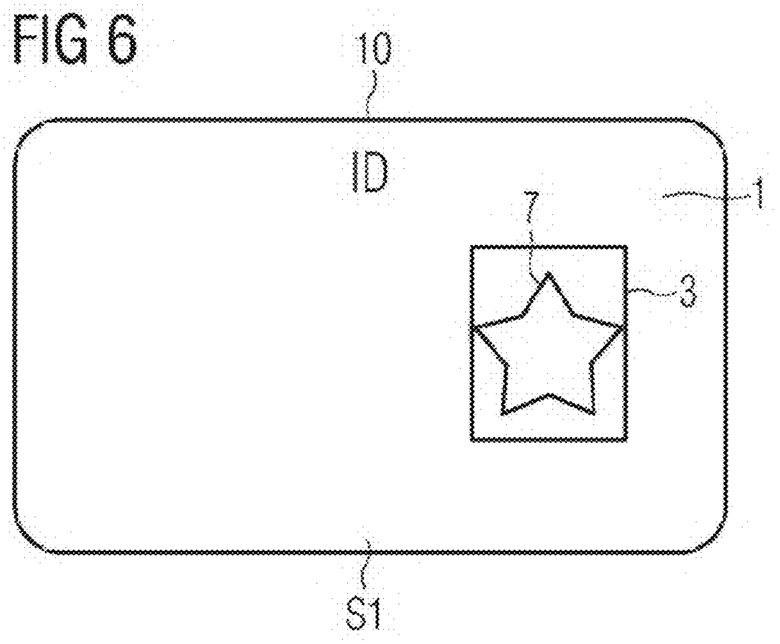
FIG. 6 shows a plan view of the exemplary personalizable security document in accordance with the present disclosure when viewed against white light.

As shown in FIG. 3, security feature 3 may further include a watermark 7 provided in substrate 1 between laser-engravable material 6 and second side S2. For example, watermark 7 may be applied on or in bottom layer 24 of substrate 1, for example, by printing watermark 7 on a top surface of bottom layer 24, for example, by silkscreen printing, flexo printing, and the like. Watermark 7 is aligned with hologram 4 (and therefore also laser-engravable material 6), and watermark 7 is visible when substrate 1 is viewed from first side S1 against white light (i.e., in transmission). This is shown, for example, in FIG. 6. The use of watermarks such as watermark 7 is well-known, such that a detailed description will be omitted. However, what is important is that watermark 7 is aligned with hologram 4, resulting in a combined feature that is more difficult to replicate.

FIG. 3 shows that an intermediate layer 26 is present between first layer 22 and bottom layer 24, on or in which watermark 7 is provided. However, it will be appreciated that in other embodiments intermediate layer 26 can be omitted, or more than one intermediate layer 26 can be provided. Likewise, it will be appreciated that watermark 7 does not need to be formed on bottom layer 24, but can also be formed on any intermediate layers between bottom layer 24 and first layer 22, if desired.

A combined thickness of laser-engravable material 6 and hologram 4 in the thickness direction d may be between 1 μm and 100 μm, preferably between 1 μm and 30 μm. Here, the expression "combined thickness" refers to a distance between opposite surfaces of the combination of hologram 4 and laser-engravable material 6 when they are provided on a single layer of substrate 1, or the combined thickness of the two features along the direction d in case one or more intermediate layers are present between the same. Clearly, however, the very small combined thickness of the combined security feature makes it very difficult to tamper with security document 10 without the result of the tampering being noticeable.

The metallic pigments mentioned above may include at least one of Al, Ag, Cu, and ZnS particles. Such metallic pigments are known to the skilled person, for example, from the Mirage security feature of HID. In some embodiments, metallic particles that exhibit a color change effect when viewed under different angles of observation (a so-called goniochromatic effect) may also be used.

INDUSTRIAL APPLICABILITY

With the above-described configurations, a personalizable security document 10 that combines two or more secure features, in particular, a laser-engraved personalized image 5 and a hologram 4 overlapping personalized image 5 can be obtained.

An exemplary method of personalizing security document 10 will be described in the following. In a first step, personalizable security document 10 in accordance with the above disclosure is provided.

In a next step, personalized image 5 is laser-engraved in laser-engravable material 6 by varying one or more laser parameters. Here, it should be evident that, due to the presence of hologram 4 on top of laser-engravable material 6, personalized image 5 is laser-engraved through hologram 4 from first side S1 using appropriate laser parameters. Here, the structure of hologram 4 may require that specific laser parameters are used in order to be able to successfully engrave personalized image 5. Therefore, knowledge of the required laser parameters may be necessary to be able to personalize security document 10, which may provide an additional layer of security, because an unauthorized third party may not possess this knowledge, and may not be capable of creating a personalized security document. In accordance with the present disclosure, appropriate laser parameters may include at least one of a laser wavelength between 515 and 1030 nm, a laser speed in a range from 2 to 4000 mm/s, and a laser repetition rate between 10 and 600 kHz.

Figure 4:
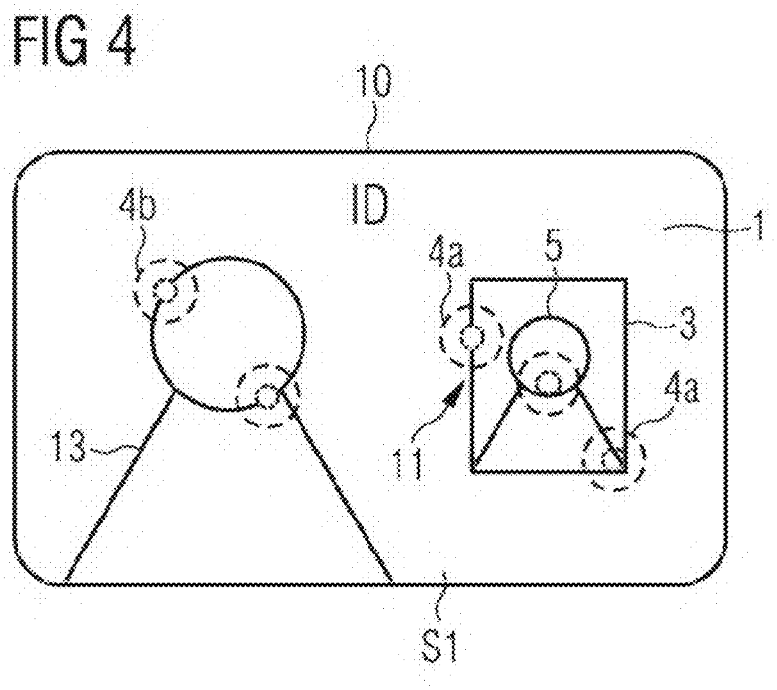
FIG. 4 shows a plan view of an exemplary personalized security document in accordance with the present disclosure.
Figure 5:
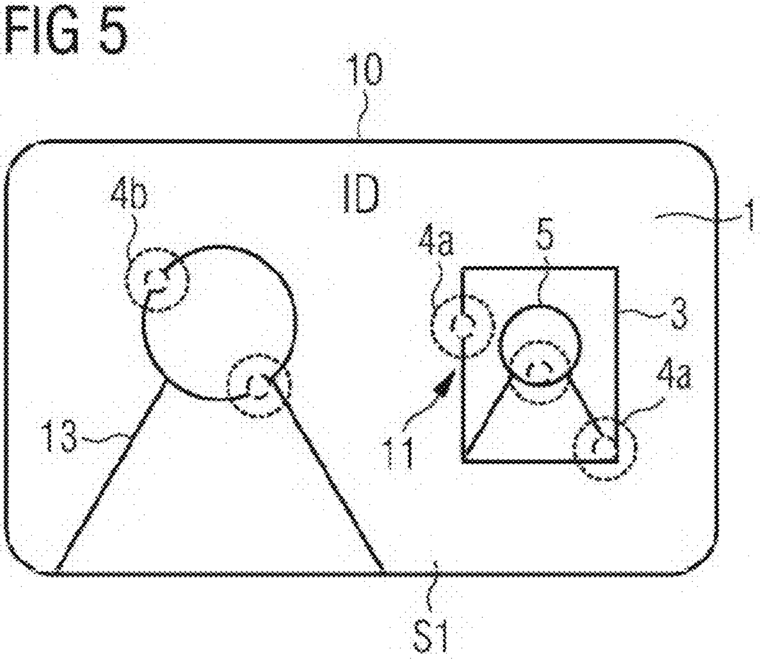
FIG. 5 shows another plan view of the exemplary personalized security document in accordance with the present disclosure.

The method may further include forming a primary personalized image 13, for example, a portrait of a holder of security document 10, in substrate 1 outside of security feature 3. Here, at least part of primary personalized image 13 may be overlapped by hologram 4, as shown in FIGS. 4 and 5. In this case, a continuous holographic security feature can be provided over both a primary personalized image and a secondary personalized image formed as part of security feature 3. This may also result in an additional layer of security. FIGS. 4 and 5 again show a change in the appearance of portions 4*a* and 4*b* of hologram 4 when security document 10 is viewed under different angles of observation, as one example for the holographic effect obtained with the present disclosure.

In some embodiments, the method may further include identifying a first hologram portion 11 of hologram 4 overlapping laser-engravable material 6, which first hologram portion 11 includes at least one holographic feature. In particular, first hologram portion 11 may be a portion overlapping a part of laser-engravable material 6, and including a specific feature that should have a different appearance than those features of hologram 4 that overlap the portion of laser-engravable material 6 in which personalized image 5 is engraved.

Here, the step of identifying may include determining a desired and fixed positional relation between hologram 4 and laser-engravable material 6, and determining the portion of hologram 4 which should have a different appearance. In the next step, personalized image 5 may then be laser-engraved in a portion of laser-engravable material 6 that is not overlapped by the identified first hologram portion 11. In this manner, no laser-engraving is performed in the portion of laser-engravable material 6 underneath first hologram portion 11, which results in that laser-engravable material 6 maintains its original appearance. For example, in the original state, laser-engravable material 6, in particular, the metallic pigments included in the same, may have a much lower reflectivity than after modification due to the laser-engraving to form personalized image 5. This results in that, for example, the visual effect obtained from hologram 4 is much more pronounced in the region in which personalized image 5 is engraved.

With the above-described selective engraving of personalized image 5, it becomes possible to selectively give different appearances to different portions of hologram 4. This can then be observed, for example, when security document 10 is viewed from first side S1 under white light at different angles of observation. It should be evident that this allows for further increasing the security of security document 10, because it requires specific knowledge of which portions of laser-engravable material 6 should not be modified during the laser engraving.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A personalizable security document comprising:

a substrate having a first side and a second side opposite to the first side in a thickness direction of the substrate; and a security feature formed in the substrate and extending through at least part of the substrate along the thickness direction;

wherein the security feature includes:

a laser-engravable material configured to have a personalized image laser engraved therein, the laser-engravable material including at least one type of pigments exhibiting a color-change effect upon irradiation with laser light, the laser-engravable material being embedded in the substrate and being visible when the substrate is viewed from the first side under white light; and a hologram provided nearer the first side than the laser-engravable material, the hologram having a first portion overlapping the laser-engravable material and a second portion provided in a same plane as the first portion and outside the security feature, the hologram being visible when the substrate is viewed from the first side under white light;

wherein a combined thickness of the laser-engravable material and the hologram in the thickness direction is between 1 μm and 30 μm, inclusive.

2. The security document of claim 1, wherein the hologram covers an entire visible area of the laser-engravable material when viewed along the thickness direction.

3. The security document of claim 1, wherein the first portion and the second portion are continuous.

4. The security document of claim 1, wherein the hologram extends over at least 10% of an entire area of the substrate when viewed along the thickness direction.

5. The security document of claim 1, wherein the substrate includes a plurality of layers, the laser-engravable material being provided on a first layer of the substrate and the hologram being provided on or in a second, different layer of the substrate.

6. The security document of claim 1, wherein the substrate includes a plurality of layers, the laser-engravable material being provided on a first side of a first layer of the substrate and the hologram being provided on or in a second, opposite side of the first layer.

7. The security document of claim 1, wherein the hologram includes at least one of a holographic switch or a Fresnel type lens.

8. The security document claim 1, wherein the security feature includes a watermark provided in the substrate between the laser-engravable material and the second side, the watermark overlapping the laser-engravable material and the hologram at least in part when viewed along the thickness direction, the watermark being visible when the substrate is viewed from the first side against white light.

9. The security document of claim 1, wherein the pigments include metallic pigments.

10. The security document of claim 9, wherein the metallic pigments comprise at least one of Al, Ag, Cu, and ZnS particles.

11. A method of personalizing a security document, the method comprising:

providing a personalizable security document in accordance with claim 1; and laser engraving a personalized image in the laser-engravable material by varying one or more laser parameters, wherein the personalized image is laser-engraved through the hologram from the first side.

12. The method of claim 11, further comprising:

identifying a first hologram portion of the hologram overlapping the laser-engravable material, the first hologram portion including at least one holographic feature; and laser engraving at least a portion of the personalized image in a portion of the laser-engravable material that is not overlapped by the first hologram portion.

13. The method of claim 11, further comprising forming a primary personalized image in the substrate outside of the security feature, wherein at least part of the primary personalized image is overlapped by the hologram.

14. The method of claim 13, wherein the primary personalized image comprises a portrait of a holder of the security document.

15. The method of claim 11, wherein the one or more laser parameters include at least one of: a laser wavelength between 515 and 1030 nm, inclusive, a laser speed in a range from 2 to 4000 mm/s, inclusive, and a laser repetition rate between 10 and 600 kHz, inclusive.

16. The method of claim 11, wherein the substrate includes a plurality of layers, the laser-engravable material being provided on a first layer of the substrate and the hologram being provided on or in a second, different layer of the substrate.

17. The method of claim 11, wherein the substrate includes a plurality of layers, the laser-engravable material being provided on a first side of a first layer of the substrate and the hologram being provided on or in a second, opposite side of the first layer.

18. The method of claim 11, wherein the security feature includes a watermark provided in the substrate between the laser-engravable material and the second side, the watermark overlapping the laser-engravable material and the hologram at least in part when viewed along the thickness direction, the watermark being visible when the substrate is viewed from the first side against white light.

19. A personalizable security document comprising:

a substrate having a first side and a second side opposite to the first side in a thickness direction of the substrate; and a security feature formed in the substrate and extending through at least part of the substrate along the thickness direction;

wherein the security feature includes:

a laser-engravable material configured to have a personalized image laser engraved therein, the laser-engravable material including at least one type of pigments exhibiting a color-change effect upon irradiation with laser light, the laser-engravable material being embedded in the substrate and being visible when the substrate is viewed from the first side under white light;

a hologram provided nearer the first side than the laser-engravable material, the hologram overlapping the laser-engravable material at least in part and being visible when the substrate is viewed from the first side under white light; and a watermark provided in the substrate between the laser-engravable material and the second side, the watermark overlapping the laser-engravable material and the hologram at least in part when viewed along the thickness direction, the watermark being visible when the substrate is viewed from the first side against white light;

wherein a combined thickness of the laser-engravable material and the hologram in the thickness direction is between 1 μm and 30 μm, inclusive.

* * * * *